United States Patent [19]

Sakamoto et al.

[11] Patent Number: 4,729,915

[45] Date of Patent: Mar. 8, 1988

[54] ELECTRICAL INSULATING MATERIAL

[75] Inventors: Seiji Sakamoto, Machida; Yoshinori Sato, Yokohama, both of Japan

[73] Assignee: Diafoil Company, Limited, Tokyo, Japan

[21] Appl. No.: 930,116

[22] Filed: Nov. 13, 1986

[30] Foreign Application Priority Data

Nov. 13, 1985 [JP] Japan ................................ 60-254315

[51] Int. Cl.⁴ ................................................ B32B 27/36

[52] U.S. Cl. .................................... 428/141; 428/336; 428/480

[58] Field of Search ............... 428/141, 480, 694, 900, 428/910, 336; 427/128

[56] References Cited

U.S. PATENT DOCUMENTS

| | | | |
|---|---|---|---|
| 3,875,119 | 4/1975 | Aoki et al. | 264/289 |
| 3,937,754 | 2/1976 | Shimotsuma et al. | 428/480 |
| 4,198,458 | 4/1980 | Mitsuishi et al. | 428/212 |
| 4,571,361 | 2/1986 | Kawaguchi et al. | 428/483 |
| 4,619,869 | 10/1986 | Kiriyama et al. | 428/480 |

FOREIGN PATENT DOCUMENTS

| | | |
|---|---|---|
| 43198 | 6/1973 | Japan . |
| 32200 | 3/1974 | Japan . |
| 132600 | 12/1974 | Japan . |
| 1920 | 1/1979 | Japan . |

*Primary Examiner*—Paul J. Thibodeau

*Attorney, Agent, or Firm*—Oblon, Fisher, Spivak, McClelland & Maier

[57] ABSTRACT

Disclosed herein is an electrical insulating material which comprises biaxially oriented polyethylene naphthalate film having a center line average roughness of 0.008 to 0.08 $\mu m$ as measured on the surface thereof and a resistivity of $5\times10^7$ to $5\times10^{10}$ $\Omega\cdot cm$ as measured in the molten state.

12 Claims, No Drawings

ELECTRICAL INSULATING MATERIAL

BACKGROUND OF THE INVENTION

The present invention relates to an electrical insulating material which is superior in heat resistance, mechanical properties, film flatness, handling qualities, and electrical characteristics. More particularly, the present invention relates to an electrical insulating material which comprises biaxially oriented polyethylene naphthalate film having a center line average roughness of 0.008 to 0.08 μm as measured on the surface thereof and a resistivity of $5\times10^{7}$ to $5\times10^{10}$ Ω·cm as measured in the molten state.

Polyethylene terephthalate film has hitherto been in general used as an electrical insulating material because of its outstanding heat resistance, mechanical and electrical properties, and processability. However, the conventional polyethylene terephthalate (Class E: a continuous allowable temperature of 120° C.) is insufficient in heat resistance in the case where the polyethylene terephthalate is to be used in recent electrical and electronic machines and equipment which have been miniaturized and lightened weight, and have high efficiency. Thus there is a demand for a new electrical insulating material having excellent heat resistance.

Use embodiments of the electrical insulating material are set forth below.

(1) Electrical insulating parts comprise the electrical insulating material and an electrical insulating paper such as kraft paper, etc. stuck to the electrical insulating material.

The electrical insulating parts are used as insulating parts of an electrical machinery and apparatus, and particularly, are used as insulating parts of motor, transformer, etc. of a heavy electric apparatus. Namely, the electrical insulating parts are used as insulating parts of a slot insulation, a layer insulation and a coil-end insulation of an electric motor and a generator. Also, the electrical insulating parts are used as insulating parts of a coil-to-coil insulation, a turn-to-turn insulation, an insulation of a high-tension circuit such as a lead wire of the transformer.

(2) An electric wire comprises a conductor and the electrical insulating material coated on the conductor.

The electrical insulating material is used for insulating the conductor and cable. Also, the electrical insulating material is used as a primary coating material or a secondary coating material of the electric wire.

(3) A flexible printed circuit board comprises the electrical insulating material and a copper foil or a ribbon-like copper core stuck on the electrical insulating material.

The flexible printed circuit board is superior in the freedom degree of an electric circuit such as curvilinear circuit, collapsible circuit etc. to a conventional rigid print board.

Polyethylene naphthalate film is a comparatively inexpensive electrical insulating material (Class F: a continuous allowable temperature of 155° C.) which meets the above-mentioned requirements. The characteristic properties thereof are described in Japanese Patent Publication Nos. 53-35280 (1978) and 54-1920 (1979), and Japanese Patent Laying-Open Nos. 48-43198 (1973), 48-43200 (1973), 48-53299 (1973), 49-132600 (1974), 49-32200 (1974), and 50-133279 (1975).

It is generally known that polyethylene naphthalate film is basically superior in heat resistance, and mechanical and electrical properties. However, the conventional polyethylene naphthalate has a shortcoming of becoming poor in film flatness and handling qualities when the film thickness is reduced. In addition, it is poor in electrical properties, especially volume resistivity at high temperatures, e.g. 120° C. So far, very few efforts have been made to improve these characteristic properties. Therefore, the improvement of these characteristic properties is expected, because that polyethylene naphthalate film can be used as a good electrical insulating material if these characteristic properties is improved.

With the foregoing in mind, as a result of the present inventors' extensive studies on polyethylene naphthalate film, it has been found that polyethylene naphthalate film is highly improved in film flatness, handling qualities, and electrical properties if it has a surface roughness in a certain range and it also has a resistivity in a certain range as measured in the molten state, and on the basis of this finding the present invention has been attained.

SUMMARY OF THE INVENTION

In an aspect of the present invention, there is provided an electrical insulating material which comprises biaxially oriented polyethylene naphthalate film having a center line average roughness of 0.008 to 0.08 μm as measured on the surface thereof and a resistivity of $5\times10^{7}$ to $5\times10^{10}$ Ω·cm as measured in the molten state.

DETAILED DESCRIPTION OF THE INVENTION

A "polyethylene naphthalate" used in the present invention represents a polymer constructed substantially of ethylene-2,6-naphthalate as the constitutional unit, and also ethylene-2,6-naphthalate polymers modified with a third component in a small amount, e.g. less than 10 mol %, preferably less than 5 mol%.

Polyethylene naphthalate is usually produced by polycondensing naphthalene-2,6-dicarboxylic acid or a functional derivative thereof such as dimethyl naphthalene-2,6-dicarboxylate with ethylene glycol under proper reaction conditions in the presence of a catalyst.

As a third component, dicarboxylic acid such as adipic acid, sebacic acid, phthalic acid, isophthalic acid, terephthalic acid and naphthalene-2,7-dicarboxylic acid, and a lower alkyl ester thereof; hydroxycarboxylic acid such as p-hydroxybenzoic acid, and a lower alkyl ester thereof; and dihydric alcohol such as propylene glycol, trimethylene glycol, tetramethylene glycol, pentamethylene glycol, and hexamethylene glycol may be exemplified.

As the polyethylene naphthalate used in the present invention, a polymer having an adequate polymerization degree indicated by an intrinsic viscosity of not less than 0.40, preferably from 0.45 to 0.90, since the polyethylene naphthalate is poor in mechanical properties in the case where polymerization degree is too low. [The method of measurement of intrinsic viscosity: 1 g of polyethylene naphthalate tip or film is added to 100 ml of phenol/1,1,2,2-tetrachloroethane (50/50 by weight) solution and the mixture is heated at 140° C. for 30 min., thereby dissolving the polyethylene naphthalate tip or film, and thereafter, an intrinsic viscosity is measured at 30.0° C.]

According to the present invention, the polyethylene naphthalate defined as mentioned above is made into film as an electrical insulating material in the following manner.

At first, polyethylene naphthalate is extruded at 280° C. to 320° C. into a sheet by using an extruder. The extruded sheet is cooled below 80° C. so that it becomes substantially amorphous. The cooled sheet is stretched in the longitudinal and transverse directions at an area draw ratio of 4. Finally, the biaxially oriented film is heat-treated at 120° C. to 250° C.

The thus obtained biaxially oriented polyethylene naphthalate film for electrical insulation should have a resistivity of $5\times10^7$ to $5\times10^{10}$ Ω·cm as measured in the molten state. The reason for this is explained is the following. It has been found by the present inventors that the conventional polyethylene naphthalate film is not necessarily satisfactory in flatness and the uneven flatness causes the variation of electrical properties, especially dielectric strength. It is known that, in the case of polyethylene terephthalate film, the flatness can be improved by the use of electrostatic cooling method. According to this method, the molten polymer sheet is electrostatically charged so that the sheet is strongly attracted toward the rotating cooling drum by the electrostatic force. It is also known that this method is effective if the molten polyethylene terephthalate has a low resistivity. However, it is not yet confirmed whether or not the electrostatic cooling method is also effective for polyethylene naphthalate. Nothing has been reported about the preferred operating range.

On the other hand, the outstanding heat resistance is one of the features of polyethylene naphthalate film useful as an electrical insulating material, and the heat resistance is expressed in terms of volume resistivity at high temperatures, e.g. 120° C. It has been found by the present inventors that the volume resistivity at high temperatures is closely related with the resistivity measured when the polymer is in the molten state. In addition, it has been found by the present inventors that both the flatness of polyethylene naphthalate film and the volume resistivity at high temperatures are closely related with the resistivity measured when the polymer is in the molten state.

According to the present invention, the resistivity of polyethylene naphthalate film measured in the molten state should be $5\times10^7$ to $5\times10^{10}$ Ω·cm, preferably $1\times10^8$ to $5\times10^{10}$ Ω·cm, and more preferably $6\times10^8$ to $5\times10^{10}$ Ω·cm. If the resistivity is lower than $5\times10^7$ Ω·cm, the polyethylene naphthalate film has such a low volume resistivity that it is poor as an electrical insulating material, although the electrostatic cooling method can be effectively applied and the resulting film is superior in flatness. On the other hand, if the resistivity is higher than $5\times10^{10}$ Ω·cm, the polyethylene naphthalate film is extremely improved in volume resistivity at high temperatures but the electrostatic cooling method is not effectively applied and the resulting film is poor in flatness.

The resistivity of polyethylene naphthalate can be adjusted by the following manner. To reduce the resistivity, polyethylene naphthalate should be incorporated with a soluble metal component. This is accomplished by adding a phosphorus compound in a small amount, e.g. less than equimolar amount, to the metallic element used as a catalyst for ester interchange reaction or the metallic element to be added as required after the ester interchange reaction or esterification reaction.

On the other hand, to increase the resistivity, the content of dissolved metallic elements in polyethylene naphthalate should be reduced. This is accomplished by reducing the amount of metallic compounds dissolved in polyethylene naphthalate, or by converting the metallic compounds mostly into metal salts such as carboxylates, phosphates, and phosphites which are insoluble in polyethylene naphthalate in the case where the metallic compounds are used in large amount. To put it concretely, the object is achieved by adding a phosphorus compound of more than equimolar amount with respect to the metallic element such as calcium and manganese used as an ester interchange catalyst.

To produce the polyethylene naphthalate film having a resistivity in a specific range, it is necessary to adjust preliminarily a resistivity of polyethylene naphthalate to be extruded. Since, it is possible to be applied effectively the electrostatic cooling method in producing an amorphous sheet, the resulting biaxially oriented film has superior flatness and improved electrical properties, especially volume resistivity at high temperatures.

According to the present invention, the polyethylene naphthalate film should have a center line average roughness of 0.008 to 0.08 μm as measured on the surface thereof. The reason for this is explained in the following. Up to now, very little has been studied on the handling qualities of polyethylene naphthalate film in contrast with a great interest in mechanical, electrical, and thermal properties derived from its chemical structure. Handling qualities are important in practical use of electrical insulating materials. With this in mind, the present inventors have examined polyethylene naphthalate film for handling qualities, e.g., film-to-film blocking and friction with film guides, and as the result, it was found that the handling qualities are closely related with the center line average roughness Ra (μm). It was also found that the preferred range of Ra varies according to the thickness of polyethylene naphthalate film, namely, the film thickness T (μm) becomes smaller and as a result the roughness value should be greater.

According to the present invention, the center line average roughness [Ra(μm)]should be 0.008 to 0.08 μm, and preferably 0.02 to 0.06 μm. A preferred value is one which satisfies the following formula representing the relationship between the center line average roughness Ra (μm) and the film thickness T (μm).

$$\frac{0.03}{T^{0.2}} \leq Ra \leq \frac{0.15}{T^{0.2}}$$

A more preferred value is one which satisfies the following formula representing relationship between Ra (μm) and T (μm).

$$\frac{0.04}{T^{0.2}} \leq Ra \leq \frac{0.1}{T^{0.2}}$$

If the value of Ra (μm) is smaller than 0.008 μm, the resulting film suffers from severe film-to-film blocking and excessive friction with film guides etc. On the other hand, if the value of Ra (μm) is greater than 0.08μm, the improvement in handling qualities reaches a plateau and the film is poor in electrical properties, especially dielectric strength, on account of the excessively rough surface.

In addition, the thickness of the polyethylene naphthalate film in the present invention is 20 to 300 μm, preferably 30 to 250 μm, and more preferably 50 to 200 μm.

As mentioned above, it is necessary in the present invention that the polyethylene naphthalate film should have a center line average roughness in a specific range, preferably in a specific range which is limited by the relation with film thickness. The surface roughness defined above can be obtained by incorporating polyethylene naphthalate with a finely divided inert compound. This is accomplished by the so-called particle separation method, or preferably by the so-called particle addition method.

According to the particle separation method, a phosphorus compound is added to the reaction system for polyethylene naphthalate. The phosphorus compound reacts with metallic compounds dissolved in the reaction system after esterification or ester interchange reaction, thereby separating out fine particles. This method is simple and easy to accept for industrial use, but it is difficult to reconcile the adequate resistivity of the polymer and the adequate surface roughness of the film, because the separated particles change the resistivity of the polymer in the molten state, which in turn adversely affects the surface roughness required of the film. And the amount of particles to separate out is limited.

On the other hand, according to the particle addition method, inert fine particles are added to polyethylene naphthalate at any stage of process from polyester production to film extrusion. As examples of the inert fine particles, metallic compounds such as kaoline, talc, magnesium carbonate, calcium carbonate, barium carbonate, calcium sulfate, barium sulfate, lithium phosphate, calcium phosphate, magnesium phosphate, aluminum oxide, silicon oxide, and titanium oxide, and carbon black may be exemplified, however they are not limitative. The form of these inert compounds may be spherical, massive, or flaky. They are not specifically limited in hardness, specific gravity, and color. The inert compound should have an average particle diameter of 0.1 to 10 μm, preferably 0.3 to 3 μm (in equivalent diameter of equal volume sphere). The inert compound should be added to the film in an amount of 0.01 to 1 wt %, preferably 0.05 to 0.8 wt %, and more preferably 0.1 to 0.5 wt %.

The electrical insulating material according to the present invention is used in the following embodiments as insulating parts.

Electrical insulating parts comprise the electrical insulating material of the present invention and an electrical insulating paper such as kraft paper, etc. stuck to the electrical insulating material.

An electric wire comprises a conductor and the electrical insulating material of the present invention coated on the conductor.

A flexible printed circuit board comprises the electrical insulating material of the present invention and a copper foil or a ribbon-like copper core stuck on the electrical insulating material.

The polyethylene naphthalate film of the present invention is superior in mechanical and thermal properties to polyethylene terephthalate film. In addition, the polyethylene naphthalate film of the present invention is superior in some other properties which have never been recognized, that is, it is improved in film flatness, electrical properties at high temperatures, and handling qualities which become conspicuous in the case of thin film. The biaxially oriented polyethylene naphthalate film according to the present invention is a very good electrical insulating material of not less than $5\times10^{14}$ Ω·cm of volume resistivity and not less than 11.0 KV of dielectric breakdown strength measured at 50 μm in thickness, which is great industrial value.

The invention will be explained in more detail with reference to the following examples, which are not intended to restrict the scope of the invention. In the examples, the physical properties were measured according to the following methods.

Center line average roughness [Ra (μm)]:

Measured in the following manner with a surface roughness tester (SE-3FK) made by Kosaka Kenkyusho Co., Ltd. Ra is a value (in μm) given by the following formula, assuming that a profile-curve part equivalent to the reference length L (2.5 cm) is sampled in the direction of the center line from the profile curve of a sample film and the roughness curve is expressed as a function Y =f(X), with the X-axis representing the center line of the sampled profile curve part and the Y-axis representing the longitudinal direction (longitudinal magnification direction).

$$Ra = \frac{1}{L} \int_O^L |f(X)|\, dX$$

Measurements are carried out with a stylus having a tip radius of 2 μm under a load of 30 mg at a cut-off value of 80 μm. Ra is expressed as an average value of ten measurements, five each in the longitudinal direction and transverse direction.

Handling qualities:

Rated in the following three ranks according to the ease of winding operation in the film making step and the subsequent film handling steps.

A : Film can be wound smoothly and passed through the subsequent steps without troubles.

B : Film can be wound and passed through the subsequent steps, but less smoothly than in the case of A.

C: Film wrinkles in the winding step and the resulting roll has the rugged edges. Film does not pass through the subsequent steps smoothly and stops the line frequently.

Resistivity in the molten state:

Measured according to the method described in Brit. J. Appl. Phys., vol. 17, pp. 1149–1154 (1966). The polymer sample is melted at 295° C. and the measurement is carried out immediately after the application of a DC voltage (1000 V).

Film flatness:

Obtained by averaging 100 measurements of film thickness, that is, at 10 points every 10 cm in the transverse direction at each of 10 points every 1000 m in the longitudinal direction.

Film thickness:

Measured with a micrometer made by Anritsu Denshi Co., Ltd. Ten pieces of film are taken from the vicinity of the point where the thickness is to be measured, and they are put one on top of the other. The measurement for the 10-piled films is converted into the thickness of a single film. The thickness irregularity of film is defined by[Xmax−Xmin/X , wherein Xmax is the maximum value of measured values, Xmin is the minimum value of measured values, and $\overline{X}$ is the arithmetic mean value of measured values. The thickness irregularity should preferably be as small as possible.

Dielectric breakdown strength:

Measured according to JIS C2318-1966 (AC short-time rise method).

Volume resistivity:

Measured at 120° C. according to JIS C2318-1966 with a tester of vibrating capacitor type.

EXAMPLE 1

Preparation of polyethylene naphthalate:

Dimethyl naphthalene-2,6-dicarboxylate (100 parts) and ethylene glycol (60 parts) were subjected to ester interchange reaction in the presence of calcium acetate monohydrate (0.1 part). The reaction was started at 180° C. and the reaction temperature was raised gradually as methanol was distilled away. After four hours, the reaction temperature reached 230° C. and the ester interchange reaction was substantially completed.

The polycondensation reaction was carried out in the usual way after the addition of phosphoric acid (0.04 parts), kaolin (0.30 parts) having an average particle diameter of 0.8 μm, and antimony trioxide (0.04 parts). As the temperature was slowly raised, the pressure was gradually reduced from normal pressure. After two hours, the temperature reached 290° C. and the pressure decreased to 0.3 mmHg. After four hours from the start of reaction, polyethylene naphthalate was discharged by the aid of pressurized nitrogen.

The polyethylene naphthalate thus obtained had an intrinsic viscosity of 0.63 and a resistivity of $1.2\times10^8$ Ω·cm is measured in the molten state. Observation under a microscope indicates that kaolin particles are extremely evenly dispersed in the polymer.

Preparation of polyethylene naphthalate film

The polyethylene naphthalate was extruded at 295° C. into an amorphous sheet by using the electrostatic cooling method. The electrostatic charging was performed by applying a DC voltage of about 9 kV to the positive electrode, which is a tungsten wire of 0.1 mm in diameter, stretched over the rotating drum in the direction perpendicular to the flow of the sheet. The rotating drum was run at a linear speed of 30 m/min. The resulting amorphous film was stretched 3.4 times in the longitudinal direction and 3.7 times in the transverse direction to give a 50μm thick biaxially oriented film. The thickness irregularity was as satisfactorily small as 0.15.

The resulting film had a center line average roughness of 0.015 μm, and the film felt smooth and had good handling qualities.

Table 1 shows the characteristic properties of the polyethylene naphthalate film, which prove the usefulness of the film as an electrical insulating material.

EXAMPLES 2 and 3 and COMPARATIVE EXAMPLES 1 to 4

Polyethylene naphthalates were produced in the same manner as in Example 1 except that the phosphoric acid and inorganic compound were changed which were added after the completion of ester interchange reaction. The resulting polyethylene naphthalate was made into a biaxially oriented film in the same manner as in Example 1, and the characteristic properties of the film were evaluated. The results are shown in Table 1.

Both samples of polyethylene naphthalate in Examples 2 and 3 had an adequate resistivity as measured in the molten state and the biaxially oriented films produced therefrom had an adequate center line average roughness. The biaxially oriented films obtained in Examples 2 and 3 were so good in handling qualities, film flatness, and electrical properties as to be used as an electrical insulating material.

In contrast, the polymer in Comparative Example 1 had an adequate resistivity as measured in the molten state, but the film produced therefrom had an excessively small value of center line average roughness because the polymer was not incorporated with inert particles that impart an adequate degree of surface roughness to the film. Therefore, the film suffered from severe film-to-film blocking and had excessive friction with film guides. It was of no practical use.

The polymer in Comparative Example 2 had an excessively low resistivity as measured in the molten state and an extremely low volume resistivity at high temperatures. Conversely, the polymer in Comparative Example 3 had such a high resistivity as measured in the molten state that the electrostatic cooling method was not effectively applied thereto. Consequently, the film produced from it was poor in flatness, and the poor flatness often causes a low dielectric breakdown voltage.

The film in Comparative Example 4 had an excessively high center line average roughness. Therefore, such a film had such a low dielectric breakdown voltage that it was not used as an electrical insulating material.

TABLE 1

| | Polyethylene-2,6-naphthalate | | | Polyethylene-2,6-naphthalate film | | | | | |
|---|---|---|---|---|---|---|---|---|---|
| Examples and Comparative Examples | Phosphoric acid (parts) | Surface roughening agent | Resistivity as measured in the molten state (Ω · cm) | Film thickness (μm) | Center line average roughness (μm) | Handling qualities | Thickness irregularity | Dielectric breakdown strength (kV) | Volume resistivity (Ω · cm) |
| Example 1 | 0.04 | Mean particle diameter 0.8 μm Kaolin 0.30 parts | $1.2 \times 10^8$ | 50 | 0.015 | A | 0.15 | 11.7 | $7.2 \times 10^{14}$ |
| Example 2 | 0.05 | Mean particle diameter 1.5 μm Calcium carbonate 0.30 parts | $4.6 \times 10^8$ | 50 | 0.039 | A | 0.16 | 11.6 | $8.6 \times 10^{14}$ |
| Example 3 | 0.06 | Mean particle diameter 1.5 μm Silicon dioxide 0.20 parts | $1.0 \times 10^9$ | 100 | 0.022 | A | 0.17 | 14.7 | $9.1 \times 10^{14}$ |
| Comparative Example 1 | 0.04 | — | $1.2 \times 10^8$ | 50 | 0.003 | C | 0.15 | 11.7 | $7.1 \times 10^{14}$ |
| Comparative Example 2 | 0.03 | Mean particle diameter 1.1 μm Kaolin 0.30 parts | $8.0 \times 10^6$ | 50 | 0.027 | A | 0.10 | 10.5 | $4.4 \times 10^{13}$ |
| Compara- | 0.09 | Mean particle diameter 0.6 μm | $6.1 \times 10^{10}$ | 50 | 0.007 | B | 0.36 | 9.8 | $9.7 \times 10^{14}$ |

TABLE 1-continued

| Examples and Comparative Examples | Polyethylene-2,6-naphthalate: Phosphoric acid (parts) | Surface roughening agent | Resistivity as measured in the molten state (Ω · cm) | Polyethylene-2,6-naphthalate film: Film thickness (μm) | Center line average roughness (μm) | Handling qualities | Thickness irregularity | Dielectric breakdown strength (kV) | Volume resistivity (Ω · cm) |
|---|---|---|---|---|---|---|---|---|---|
| tive Example 3 | | Kaolin 0.04 parts | | | | | | | |
| Comparative Example 4 | 0.05 | Mean particle diameter 5.0 μm Kaolin 0.40 parts | $5.0 \times 10^8$ | 50 | 0.120 | C | 0.16 | 10.0 | $8.5 \times 10^{14}$ |

EXAMPLE 4

Three kinds of biaxially oriented polyethylene naphthalate film, each having a thickness of 5 μm, 10 μm, and 100 μm, were produced in the same manner as in Example 1. All of them had a center line average roughness of 0.015 μm. When these films and the film of 50 μm in thickness in Example 1 were examined for handling qualities, a difference was noted. The film of 50-μm in thickness and the film of 100-μm in thickness were satisfactory in handling qualities without film-to-film blocking. In contrast, the film of 5-μm in thickness and the film of 10-μm in thickness, suffered from severe film-to-film blocking and produced much friction with the guides in the handling process. This indicates that the film should satisfy the above-mentioned relationship between the center line average roughness Ra (μm) and the film thickness T (μm).

What is claimed is:

1. An electrical insulating material, which comprises: a biaxially oriented polyethylene naphthalate film having a center line average roughness of 0.008 to 0.08 μm as measured on the surface thereof and a volume resistivity of $5\times10^7$ to $5\times10^{10}$ Ω·cm as measured in the molten state.

2. The electrical insulating material as claimed in claim 1, wherein a thickness of the film is 20 to 300 μm.

3. The electrical insulating material as claimed in claim 1, wherein the film has a center line average roughness of 0.02 to 0.06 μm as measured on the surface thereof.

4. The electrical insulating material as claimed in claim 1, wherein the film has a resistivity of $1\times10^8$ to $5\times10^{10}$ Ω·cm as measured in the molten state.

5. The electrical insulating material as claimed in claim 1, wherein the polyethylene naphthalate starting material empolyed to prepare said electric insulating material has an intrinsic viscosity of not less than 0.40.

6. The electrical insulating material as claimed in claim 5, wherein said intrinsic viscosity ranges from 0.45 to 0.90.

7. The electrical insulating material as claimed in claim 2, wherein the thickness of said film ranges from 30 to 250 μm.

8. The electrical insulating material as claimed in claim 7, wherein said thickness ranges from 50 to 200 μm.

9. The electrical insulating material as claimed in claim 1, which material has volume resistivity of $5\times10^{14}$ Ω·cm and a dielectric breakdown strength, measured at 50 μm thickness, of not less than 11.0 KV.

10. The electrical insulating material as claimed in claim 1, wherein the polyethylene naphthalate starting material empolyed to prepared said film is polyethylene-2,6-naphthalate.

11. The electrical insulating material as claimed in claim 10, wherein said polyethylene-2,6-naphthalate is prepared by reacting dimethyl naphthalene-2,6-dicarboxylate with ethylene glycol.

12. The electrical insulating material as claimed in claim 11, wherein said reaction is conducted in the presence of less than 10 mole percent of a third component selected from the group consisting of adipic acid, sebacic acid, phthalic acid, isophthalic acid, terephthalic acid, naphthalene-2,7-dicarboxylic acid, lower alkyl esters thereof, p-hydroxybenzoic acid, lower alkyl esters thereof, propylene glycol, trimethylene glycol, tetramethylene glycol, pentamethylene glycol and hexamethylene glycol.

* * * * *